United States Patent [19]

Boutin

[11] Patent Number: 4,550,033

[45] Date of Patent: Oct. 29, 1985

[54] FREE-FLOWING FLAKES OF HYDROPHILIC/WATER-SOLUBLE POLYMER GEL

[75] Inventor: Jean Boutin, Mions, France

[73] Assignee: Rhone-Poulenc Specialites Chimiques, Courbevoie, France

[21] Appl. No.: 515,643

[22] Filed: Jul. 20, 1983

[30] Foreign Application Priority Data

Jul. 20, 1982 [FR] France .................. 82 12611

[51] Int. Cl.$^4$ .............................................. B05D 7/00
[52] U.S. Cl. .......................................... 427/222; 241/6
[58] Field of Search ............... 427/180, 212, 222, 242; 241/16

[56] References Cited

U.S. PATENT DOCUMENTS

| | | | |
|---|---|---|---|
| 3,334,070 | 8/1967 | Chezaud | 260/75 |
| 3,687,699 | 8/1972 | Prosser et al. | 427/180 |
| 3,876,573 | 4/1975 | Engelhardt et al. | 524/47 |
| 4,359,492 | 11/1982 | Schlademan | 427/180 |

FOREIGN PATENT DOCUMENTS 2109642  5/1972  France .
2368503  5/1978  France .

*Primary Examiner*—Shrive P. Beck
*Attorney, Agent, or Firm*—Burns, Doane, Swecker & Mathis

[57] ABSTRACT

Storage-stable, discrete free-flowing flakes of a hydrophilic or water-soluble polymer gel, such flakes comprising a thin adherent film coating of a processing aid powder, are facilely produced by comminuting a larger shaped article of said polymer gel, e.g., a block, sheet, strip or layer thereof, in the presence of said processing aid powder, and said powder being present during comminution in an amount in excess of that required for otherwise complete coating of the flakes which result.

21 Claims, No Drawings

FREE-FLOWING FLAKES OF HYDROPHILIC/WATER-SOLUBLE POLYMER GEL

BACKGROUND OF THE INVENTION

1. Field of the Invention

The present invention relates to the preparation of flakes of hydrophilic (water-swellable) or water-soluble acrylic polymers of polyacrylamide type, and also to the discrete, non-adherent, free-flowing flakes, per se, thus prepared.

2. Description of the Prior Art

Water-soluble acrylic homopolymers and copolymers having a high molecular weight are adapted for many useful applications in the form of dilute aqueous solutions thereof, more particularly as flocculating agents used in waste water processing, or as thickening agents in the paper and petroleum industries. Hydrophilic acrylic copolymers are characterized as materials which are not water-soluble but which absorb aqueous fluids; these copolymers may more particularly be employed as water-retaining agents in the fields of agriculture, horticulture, floriculture, etc.

These polymers may be obtained by polymerization of acrylic monomers in aqueous solution. Through this type of process, the polymer is provided in the form of sheets, layers or blocks of a solid gel having a plastic, rubbery consistency and which must subsequently be chopped, shredded or otherwise comminuted using a special device of the extruder or "meat grinder" type.

It is not possible to directly package the polymer in the form of a chopped or shredded gel, because the rubbery, adhesive pieces agglomerate and become fused during storage. The gels are therefore normally dehydrated, dried and ground into a fine powder. However, drying and grinding are processes that are expensive, as they entail a substantial investment and high operating expenses and they also can result in deterioration of the polymer. In the case of the water-soluble polymers, such deterioration results in reduced viscosity in solution and/or the formation of insoluble microgels unless adequate precautions are taken. In addition, the dried and ground powder contains fine, dust-generating particles that tend to form flocs that dissolve with difficulty during preparation of aqueous solutions therefrom.

Various methods for processing polyacrylamide powders or gels have to date been proposed to this art for avoiding agglomeration, reducing the formation of dust particles, or improving the fluidity and/or increasing the speed of dissolution thereof in water.

Thus, according to U.S. Pat. No. 4,080,358, polyacrylamides in a finely divided state are mixed with a poly(alkylene)glycol and an anti-clotting agent (free-flow aid) such as a silica or silicate. The anti-clotting agent is added after drying the gel and sifting to the appropriate size. According to French Pat. No. 2,368,503, the problems of the adhesive properties of the surface of a hydrogel of the polyacrylamide type are remedied by coating same with a fatty acid or an alkaline salt thereof. The fatty acid is used in a proportion of approximately 0.01% and can be added at the polymerization stage or by sprinkling or pulverizing same over the gel, either prior to grinding or after grinding. It is specified that the result obtained is substantially the same regardless of the method employed. After grinding, the gel particles are dried.

According to another known process (French Pat. No. 2,150,973), polyacrylamide gels in the stable form, that are not adhesive and that contain 40 to 90% water are ground and subsequently sprinkled with an inorganic or organic substance such as a starch, a dextrin, a silicate, a clay, or activated silica.

However, through these processes non-adhesive, very small granules are not directly produced by the device in which the gel is ground.

SUMMARY OF THE INVENTION

Accordingly, a major object of the present invention is the provision of an improved process for the production of hydrophilic or water-soluble gels in the form of very small flakes which can be packaged easily and which do not agglomerate during storage.

Another object of the invention is to provide a water-soluble polymer which does not form dust particles, which is readily dispersible in water and which rapidly dissolves without the formation of flocs or insoluble microgels.

Another object of the invention is to provide a hydrophilic or water-soluble polymer in the form of flakes obtained from sheets, layers or blocks of rubbery gels that does not have to be subjected to subsequent drying or grinding operations.

Briefly, the improved process according to the invention features the chopping or otherwise comminuting of the rubbery gel in a shredding machine in the presence of a particulate, solid organic or inorganic processing aid, in a weight ratio such that, at the outlet of the device, a mixture formed of flakes of the polymer gel is obtained, and that these flakes are coated with the processing aid and an excess of the powdered processing aid.

DETAILED DESCRIPTION OF THE INVENTION

More particularly according to the present invention, it has now unexpectedly and surprisingly been found that polymer gels or hydrogels can be provided in fluid, granular, non-agglomerative form only if the gel is chopped or otherwise comminuted in the presence of an amount of processing aid in excess of the amount required for completely coating the individual particles. If the processing aid is incorporated either during polymerization or after chopping, or in insufficient amounts, the gel in the form of individual, non-agglomerative granules cannot be produced.

Advantageously, the excess powder is separated from the polymer flakes by sifting.

The process according to the invention is applicable to acrylic polymer gels obtained by polymerization or copolymerization in aqueous solution of acrylic monomers in accordance with any conventional method. It is preferable to employ processes for polymerization through irradiation which provide for high molecular weights. The process is particularly well adapted to gels obtained by thin layer photopolymerization on a hydrophobic support, in the presence of a photoinitiator. For details as to such preparative technique, reference is made to published French patent application Nos. 2,348,227, 2,428,054 and 2,453,185; U.S. Pat. Nos. 4,178,221, 4,252,625, 4,306,955 and 4,308,148.

The following are exemplary acrylic monomer starting materials: acrylamide, methacrylamide, sodium 2-acrylamido-2-methylpropanesulfonate, acrylonitrile, methacrylonitrile, acrylic acid, methacrylic acid and salts or esters thereof, e.g., the hydroxyalkyl(meth)acrylates, aminoalkyl acrylates and methacrylates which may be quaternary, and mixtures thereof. The nature and proportion of monomers, the type of catalyst, initiator and/or the irradiation period are obviously selected in such manner as to produce a water-soluble or hydrophilic polymer suited for the particular intended application. The molecular weight of the water-soluble polymer is normally greater than 1 million, preferably greater than 3 million.

The hydrophilic copolymers are prepared from the same monomers, but are slightly reticulated using conventional procedures in polymer technology, by irradiation or by incorporation in the polymerization recipe of monomers to be polymerized, a multi-purpose reticulating monomer or cross-linking agent, such as, for example, the divinyl ether of diethylene glycol, ethylene glycol dimethacrylate, divinylbenzene, N,N'-methylene bisacrylamide or methylolacrylamide. The quantity of reticulating agent normally ranges from 0.025 to 2% relative to the total weight of the monomers. The degree of reticulation must be sufficient such that the resulting copolymers are insoluble in water but are nonetheless highly water-absorbent.

Depending upon the nature of the monomers, the concentration of the polymer in the rubbery gel may range from 20 to 85% by weight. More particularly, such concentration typically ranges from 20 to 60%, preferably from 40 to 50% for anionic and nonionic polymers and from 40 to 85%, preferably from 40 to 75%, for cationic polymers.

The processing aid employed in the process according to the invention is a mineral (inorganic) or organic powder, which is inert relative to the polymer, and has the capacity to absorb water or to prevent loss of humidity or moisture and has good coating properties. For example, the various silicas, silicates, aluminas, starches and fatty acids are representative.

Thus, precipitated silicas in the form of fine particles having large surface areas may be used. Preferably, the silicas employed will display a specific BET surface area ranging from 200 to 400 $m^2/g$, a final particle diameter ranging from 200 to 800 Å, an average diameter of agglomerates of less than 100 microns and an apparent density for the packed product of less than 0.25, and preferably less than 0.20.

Natural or synthetic alumina hydrates may also be employed, or dried alumina gels of the boehmite type displaying a surface area of 200 to 400 $m^2/g$ and pore sizes of 50 to 100 Å.

Further, silicates such as hydrated aluminum silicates in the form of clay may be used, or the natural or synthetic zeolites. Examples of clays that are useful are attapulgite, sepiolite, bentonite, vermiculite, and the like.

The processing aid may also be an organic substance such as starch and starch derivatives, for example, or fatty acids and alkali metal salts thereof.

Among all of the foregoing, it is preferred to use silicas and clays having a high water absorbency capacity.

The proportion of the processing aid relative to the polymer gel will vary depending upon the nature and quantity of dry solids in the gel, depending upon the nature and granulometry of the processing aid and according to the desired dimensions of the flakes to be produced. As heretofore noted, it is essential to use an excess of processing aid relative to the amount that will adhere to the gel flakes. The quantity required in each particular case can easily be determined by performing a few simple preliminary tests. In general, this quantity will range from 5 to 40% by weight inclusive, relative to the gel weight; preferably, 15 to 35 g of processing aid are used per 100 grams of gel.

The process according to the invention is carried out in the following manner: The polymer gel, in the form of a strip or of other large pieces, is inserted into the shredder or comminutor together with the processing aid powder. Alternatively, the gel and powder may be mixed in advance, or the processing aid may be sprinkled over at least one of the two sides of the elastic strip and then the mixture inserted into the shredding device. A grinder/shredder of meat grinder type may be used, comprising a metal Archimedes' screw which rotates inside a cylinder in such manner that the outside edges of the screw are in close proximity to the internal walls of the cylinder which houses them, but do not actually touch said walls. The screw forces the elastic gel against a perforated plate having a large number of orifices, which serves as a draw plate for the comminuted mixed product. Extrusion is aided by blades which are integral with the screw and which rotate against the perforated plate. The head of the grinder may be cooled to reduce overheating caused by the friction of the blades on the draw plate and by the pressure of the gel on the various parts of the grinder. The diameter of the draw plate orifices ranges from 1 to 10 mm inclusive, preferably from 2 to 8 mm and more preferably from 4 to 6 mm.

The mixture obtained at the outlet of the apparatus comprises perfectly separated flakes of gel coated with the powdered processing aid and of the excess powder. This mixture may be packed directly.

In a preferred embodiment of the invention, the mixture obtained at the outlet of the grinder is sifted through a screen, having grid openings of a size less than or equal to 0.5 mm. The excess processing aid, which may potentially contain a small proportion of polymer, may be recycled in the grinder.

Too, the process may be performed either continuously or discontinuously with the polymerization itself.

The resulting product is provided in the form of burst or fragmented polymer grains or flakes coated with a fine, adherent film of processing aid. The amount of coating typically ranges from 1 to 20% by weight. The average dimensions of the particles range from approximately 0.3 to 8 mm, advantageously from 0.5 to 5 mm and preferably from 1 to 4 mm. Due to their size, the flakes of water-soluble gel easily disperse in water and dissolve without flocculating.

The advantages of the process according to the invention are, specifically, that it provides the capacity to prepare non-adhering flakes of a small size, without the need to perform the drying and grinding operations to date required by the art which can result in partial deterioration of the polymer.

In order to further illustrate the present invention and the advantages thereof, the following specific examples are given, it being understood that same are intended only as illustrative and in nowise limitative.

EXAMPLE 1

Preparation of the water-soluble gel

An aqueous solution was formulated from the following materials:

|     |                    |         |
| --- | ------------------ | ------- |
| (i) | Water              | 130.1 g |
| (ii)| Acrylic acid       | 35.2 g  |
| (iii)| 50% NaOH          | 39.0 g  |
| (iv)| Acrylamide         | 95.3 g  |
| (v) | Sodium gluconate   | 1.6 g   |

While excluding light therefrom, 0.4 ml of a solution of 34 g of benzildimethylacetal per liter of acrylic acid was added thereto.

The pH was adjusted to 12.5 using sodium hydroxide. The solution was deoxygenated using a stream of nitrogen. The solution was poured onto a flat stainless steel plate measuring 36 cm in length, 15 cm in width, with a 1 cm flange, such as to form a 5.2 mm layer of uniform thickness. The gaseous layer enveloping the liquid layer, confined by a glass plate, was deoxygenated prior to addition of the liquid mixture using a stream of damp nitrogen. The thin liquid layer was exposed for 15 minutes to radiation from three ultraviolet lamps of actinic type (Philipps TLDAK 30W05); the intensity of the lamps progressively increased from 400 watts/m$^2$ to 1200 watts/m$^2$. The plate was cooled from below during irradiation by streams of water. After 15 minutes of irradiation, a 5.2 mm thick layer of rubbery gel was obtained, containing 47.5% by weight of dry solids.

This procedure was repeated several times.

The rubbery layer obtained was cut into strips measuring approximately 4×5×0.52 cm. Into a stainless steel receptacle were mixed 600 g of such strips and 180 g of precipitated silica having a BET specific surface area of 250 m$^2$/g, an ultimate particle diameter of 225 Å, a diameter of tertiary agglomerates of 70 μm and an apparent density for the packed product of 0.19. (TIXOSIL 38 A available from RHONE-POULENC).

The mixture was slowly introduced into a meat grinder apparatus equipped with an Archimedes' screw measuring 12 cm in length and having a diameter of 4.9 to 4.2 cm, and a 7 cm diameter draw plate with 4 mm perforations. The temperature of the grinder was maintained at 23° to 25° C. using compressed air.

The white, burst or fragmented flakes of polymer gel were recovered. Same were separated from one another and did not adhere.

Granulometry was determined on the mixture obtained, using an AFNOR strainer with perforations or orifices varying from 40 to 4,000 microns. From each fraction obtained, the following were determined: the percentage of silica by silicon determination (X-ray fluorescence), the percentage of polymer by carbon determination (elemental microanalysis) and the percentage of water by evaporation at 105° C.

The various results obtained are reported in Table I.

TABLE I

| Dimension of fraction in microns | % Weight | % SiO$_2$ | % Water | % Polymer |
| --- | --- | --- | --- | --- |
| Over 4,000 | 0 | — | — | — |
| Between 3,150 and 4,000 | 0.94 | — | 42.6 | — |
| Between 2,500 and 3,150 | 10.73 | 4.1 | 44.1 | 51.3 |
| Between 2,000 and 2,500 | 17.97 | 9.0 | 44.5 | 46.5 |
| Between 1,600 and 2,000 | 13.95 | 5.7 | 43.5 | 48.2 |
| Between 1,000 and 1,600 | 24.52 | 10.5 | 43.0 | 46.0 |
| Between 500 and 1,000 | 11.45 | 13.67 | 42.9 | 43.4 |
| Between 100 and 500 | 12.02 | 56.6 | 27.9 | 13.2 |
| Between 40 and 100 | 7.61 | 77.0 | 18.3 | 3.0 |
| Less than 40 | 0.81 | — | — | — |

The portion which was smaller than 500 μm (20.44%) was primarily comprised of silica. The portion which was larger than 500 μm (79.56%) was formed of gel containing, on average, 47% polymer, 44% water, and 9% silica.

To determine the rate of dissolution of the various fractions, 5.75 g of each fraction were placed in a beaker containing 500 ml of demineralized water agitated with a magnetic stirring rod. The period required to develop maximum viscosity was recorded, which corresponded to time required for dissolution. Measurements were taken at 20° C. using a model RVT Brookfield viscosimeter at a speed at 10 rpm using paddle No. 1, 2, 3 or 4 depending upon the viscosity. The results of this test are reported in Table II.

TABLE II

| | VISCOSITY IN m · Pa · s | | | |
| --- | --- | --- | --- | --- |
| Time in minutes | 2000–2500 μm fraction | 1600–2000 μm fraction | 1000–1600 μm fraction | 500–1000 μm fraction |
| 10 | 140 | 300 | 1,800 | 2,000 |
| 25 | 700 | 3,600 | 3,500 | 3,500 |
| 50 | 3,700 | 7,000 | 4,000 | 3,500 |
| 75 | 5,500 | 7,300 | 4,300 | 3,300 |
| 100 | 5,300 | 7,100 | 4,100 | 3,100 |

EXAMPLE 2

Two sheets of rubbery gel were prepared as described in Example 1. The sheets were separated into three fractions weighing 200 grams each.

200 g were chopped/comminuted in the manner described in Example 1, but the silica was omitted. This "control chopped product" was in the form of stringy material which agglomerated.

200 g were also chopped/comminuted without the silica, dried for one hour at 70° C. in a ventilated oven and ground. This produced the "control powder".

200 g were coated on both sides with 2 g of neutral sodium sulfite, then chopped/comminuted with 60 g of TIXOSIL 38 A silica. The product was screened to a particle size of 500 μm.

The test solutions were prepared in a manner identical to that described in the preceding example, with a polymer content, expressed by weight, of 0.5% polymer; 5% sodium chloride was added to each solution and the Brookfield viscosity was measured. The time required for dissolution of the control chopped product was 24 hours; the viscosity of the solution was 290 mPa.s. For the control powder and the product according to the invention, complete dissolution was obtained, respectively, in one and four hours; however, the viscosity was 240 mPa.s for the control powder and 310 mPa.s for the product according to the invention.

The three products were packed separately and, on each sample, a pressure of 0.2 kg per cm$^2$ was applied. After five days of pressure, the control chopped sample formed a rubbery block, while the control powder and the flakes according to the invention remained fluid.

EXAMPLE 3 (Comparative)

200 g of rubbery sheet, prepared as described in Example 1, were chopped/comminuted in a grinder having a 4 mm draw plate. The chopped gel was mixed by hand with 60 g of TIXOSIL 38 A silica. A mixture of rubbery strands and silica was obtained. This mixture was replaced in the meat grinder. Adherent stringy material was again obtained.

EXAMPLE 4

Rubbery gel sheets were prepared and cut into strips as described in Example 1. 600 g of strips were mixed with 180 g of TIXOSIL 38 A silica. Over 24 minutes, the mixture was placed in the grinder equipped with a 6 mm draw plate. The head of the grinder was continuously cooled with a stream of cold water circulating therewithin. The mixture was screened to particle sizes of 500 μm (Test A).

The operation was repeated until a total of at least 180 g of powder having a granulometry of less than 500 μm were obtained. In the following tests, 180 g of fraction of less than 500 μm from the preceding example were recycled with 600 g of gel strips and screened (Tests B to E).

The results of analysis of each fraction are reported in Tables III and IV, wherein the percentages are by weight.

TABLE III

| FRACTIONS LARGER THAN 500 μm | | | | | |
|---|---|---|---|---|---|
| | Test A | Test B | Test C | Test D | Test E |
| Quantity (%) | 76 | 79 | 80 | 80 | 80 |
| Polymer (%) | 50.5 | 48.4 | 47.9 | 50.0 | 50.2 |
| $SiO_2$ (%) | 2.96 | 3.92 | 3.66 | 1.5 | 1.4 |
| Water (%) | 46.3 | 46.9 | 47.8 | 47.9 | 46.7 |
| Brookfield Viscosity, 9.3 g/l solution | 4250 | 4150 | 4050 | 4100 | 4000 |

TABLE IV

| FRACTIONS SMALLER THAN 500 μm | | | | | |
|---|---|---|---|---|---|
| | Test A | Test B | Test C | Test D | Test E |
| Quantity (%) | 24 | 21 | 20 | 20 | 20 |
| Polymer (%) | 3.3 | 5.7 | 9.4 | 13.2 | 16.2 |
| $SiO_2$ (%) | 74.8 | 65.15 | 59.8 | 57.0 | 50.35 |
| Water (%) | 19.1 | 23.0 | 25.8 | 26.5 | 27.4 |

The granulometric distribution of the five fractions of particle sizes greater than 500 μm was the following:

TABLE V

| Dimensions (microns) | Test A | Test B | Test C | Test D | Test E |
|---|---|---|---|---|---|
| Less than 4000 | 15.28 | 17.0 | 16.12 | 17.3 | 18.2 |
| Between 3150 and 4000 | 29.33 | 30.2 | 28.23 | 29.9 | 30.4 |
| Between 1000 and 3150 | 51.42 | 49.1 | 50.89 | 48.6 | 47.2 |
| Between 500 and 1000 | 3.97 | 3.7 | 4.76 | 4.2 | 4.2 |

The five fractions exhibited essentially the same granulometry, with 77 to 81% of the particles ranging from 1 to 4 mm.

The five fractions of particle sizes greater than 500 μm were placed in five separate packets to which a pressure of 0.2 kg/cm² was applied. After five days under pressure, the flakes remained free-flowing.

EXAMPLE 5

600 g of strips obtained as in Example 1 were mixed with 180 g of various processing aids. Each mixture was placed in the grinder equipped with a 6 mm draw plate and cooled with cold water. The chopped product was screened to a particle size of 500 μm. The percentages obtained are reported in Table VI.

The following processing aids were used:
(1) Aluminosilicates:
 (i) Type A bentonite (GADOR Company) (activated artificial sodium-containing absorbent clay; 95% of particles smaller than 74 μm; apparent density, 0.7);
 (ii) F 50 bentonite (GADOR Company); and
 (iii) Attapulgite (ground fibrous clay; 95% of particles smaller than 40 μm; apparent density, 0.2) (compressed product).
(2) Potato Starch (CELLOCOL LZ from DOITTAU Company);
(3) Stearic Acid:

TABLE VI

| | QUANTITY (%) | |
|---|---|---|
| | % >500 μm | % >500 μm |
| Bentonite A | — | — |
| Bentonite F 50 | — | — |
| Attapulgite | 81.45 | 18.55 |
| Starch | 94.5 | 5.5 |
| Stearic Acid | 83 | 17 |

In all cases, the product from the grinder was in the form of separate, free-flowing non-adhering flakes, properties imparted only by the presence of excess amounts of the processing aid powders.

For the product coated with attapulgite, 81% of the fraction having particle sizes greater than 500 μm was formed of particles with sizes ranging from 1600 to 4000 μm.

EXAMPLE 6

In this example, a cationic polymer gel was employed.

The following aqueous solution was prepared:

| | | |
|---|---|---|
| (i) Water | 155 | g |
| (ii) Glycerin | 3.1 | g |
| (iii) Solution of 80% ethyltrimethylammonium methacrylate chloride and 20% water | 15.8 | g |
| (iv) Acrylamide | 113.5 | g |
| (v) Adipic acid | 12.6 | g |

While excluding light from this solution, 1.31 ml of a solution of 8.66 g of benzildimethylacetal per liter of a 50/50 by volume mixture of methanol/isopropanol was added thereto.

The pH dropped to the 2.7 to 2.9 range. The solution was deoxygenated using a stream of nitrogen. The solution was poured onto a steel plate as described in Example 1.

For 15 minutes, the plate was exposed to UV radiation as in Example 1, but the intensity progressively increased from 800 watts/m² to 1200 watts/m²; the plate was cooled during irradiation.

A sheet of gel containing 43% dry solids was obtained.

Into the grinder, equipped with a 6 mm draw plate, and while the grinder head was cooled with water, were placed 600 g of strips measuring 4×5×0.52 cm and 180 g of TIXOSIL 38 A silica, over about 30 minutes.

The product output of the grinder was in the form of non-adhering, free-flowing grains which could be packaged. The granulometric distribution thereof was the following:

| Dimensions in Microns | % of Total |
| --- | --- |
| Greater than 2000 | 46.7 |
| Between 1000 and 2000 | 19.7 |
| Between 500 and 1000 | 5.2 |
| Between 100 and 500 | 12.9 |
| Less than 100 | 15.5 |

EXAMPLE 7

A cationic polymer gel containing 56.8% by weight of dry solids was employed.

The following aqueous solution was prepared:

| (i) Water | 108.4 g |
| --- | --- |
| (ii) Glycerin | 4 g |
| (iii) Solution of 80% ethyltrimethyl ammonium methacrylate chloride and 20% water | 84.8 g |
| (iv) Acrylamide | 102.8 g |

While excluding light from this solution, 1.63 ml of a solution of 13.5 g of benzilmethylacetal per liter of a 50/50 mixture by volume of methanol/isopropanol was added thereto.

The normal pH of 2.5 was maintained. The mixture was deoxygenated using a stream of nitrogen. In a deoxygenated atmosphere, the solution was poured to a thickness of approximately 5.2 mm onto a stainless steel plate that had previously been coated with a thin layer of Cemulcat K 2 SH from SFOS. Same was irradiated for 15 minutes using three actinic lamps; the intensity of irradiation was maintained at 1200 watts/m². After cooling, the resulting rubbery sheet of gel was cut into strips measuring 4×5×0.52 cm and mixed with 90 g of TIXOSIL 38 A silica.

This mixture was fed into the grinder fitted with a 6 mm draw plate; the grinder head was cooled with water.

At the grinder outlet, after screening the product to a particle size of 500 microns, non-adhering, free-flowing grains were obtained that rapidly dissolved in water and could be packaged as such.

EXAMPLE 8

In this example, the type and quantity of processing aid were varied.

Polymer gel prepared as described in Example 1 was used. The grinder was fitted with a 6 mm draw plate; the grinder head was cooled with water.

The TIXOSIL 33J was a finely divided, hydrated, micronized silica available from RHONE-POULENC, having the approximate formula 10 $SiO_2$- 1 $H_2O$, 5$H_2O$, a specific surface area of 210 m²/g, an apparent density of 0.10 for the compressed product; the average diameter of the agglomerates was 3 microns and the average diameter of the elementary particles was 200 Å.

The compositions and results are reported in Table VII. It is apparent that if the amount of processing aid was insufficient, a gel in the form of individual, free-flowing non-adhering grains was not obtained.

TABLE VII

| Type of Product | Amount for 600 g of strips (in g) | Dimensions >500 μm (%) | Dimensions <500 μm (%) | Appearance of Product at Grinder Outlet |
| --- | --- | --- | --- | --- |
| Tixosil 38A | 90 | 88.2 | 11.8 | Individual, free-flowing, non-adhering grains |
| Tixosil 38A | 45 | 95.8 | 4.2 | Individual, free-flowing, non-adhering grains |
| Tixosil 38A | 22 | — | — | Individual grains initially, then continuous stringy material |
| Tixosil 33J | 90 | 90.7 | 9.3 | Individual, free-flowing, non-adhering grains |
| Tixosil 33J | 45 | — | — | Continuous stringy material |

EXAMPLE 9

Preparation of a Hydrophilic Gel

The following aqueous solution was prepared:

| (i) Water | 103.5 g |
| --- | --- |
| (ii) Acrylic acid | 44.4 g |
| (iii) N,N'—methylene-bis-acrylamide | 0.3 g |
| (iv) 50% NaOH | 48.8 g |
| (v) Acrylamide | 103.5 g |

While excluding light from this solution, 0.32 ml of a solution of 34 g of benzildimethylacetal per liter of acrylic acid was added thereto.

The solution was deoxygenated using a stream of nitrogen. The solution was poured over a flat stainless steel plate measuring 36 cm in length, 15 cm in width, with a 1 cm flange, such as to form a 5.2 mm layer. The gaseous layer enveloping the liquid layer, confined by a glass plate, was deoxygenated using a stream of damp nitrogen prior to addition of the liquid. The thin liquid layer was exposed for 15 minutes to radiation from three ultraviolet lamps of the actinic type (Philipps TLDAK 30W05); the intensity of the lamps progressively increased from 400 watts/m² to 1200 watts/m². During irradiation, the plate was cooled from beneath by means of streams of cooling water. After minutes of irradiation, a thin layer of rubbery gel was obtained, having a thickness of 5.2 mm.

The rubbery layer thus obtained was cut into strips measuring approximately 4×5×0.52 cm. Into a stainless steel receptacle, 300 g of strips were mixed with 90 g of attapulgite.

The mixture was slowly introduced into a meat grinder equipped with an Archimedes' screw having a length of 12 cm and a diameter of 4.9 to 4.2 cm, and a face plate having a diameter of 7 cm and a plurality of 6 mm orifices. The temperature of the grinder was maintained at 23°-25° C. using compressed air. The mixture was screened to particle sizes of 500 μm; the fraction of particle sizes less than 500 μm could be recycled.

White, burst and fragmented flakes of polymer were obtained; same were separate from each other and free-flowing and non-adhering; the dimensions of the flakes varied from 0.5 mm to 2.5 mm.

The product (fraction of particle sizes larger than 500 microns) was placed in 100 times its volume of water for three minutes, then filtered on a 160 μm strainer. The increase in weight was then measured, representing the rate of absorption. A rate of absorption of 3400 g of water per 100 g of product was obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the production of a plurality of small, storage-stable, non-adhering and free-flowing flakes of a gel of a hydrophilic or water-soluble polymer coated with a thin adherent film of processing aid powder, comprising comminuting a larger shaped article of the polymer gel in the presence of a processing aid powder, said powder being present in an amount in excess of an amount required for otherwise complete coating of the flakes which result whereby burst grains or flakes are obtained, and said powder being inert with respect to the polymer and either water absorbent or adapted to prevent dehydration of the polymer gel.

2. The process as defined by claim 1, wherein said polymer gel is comprised of an acrylic polymer.

3. The process as defined by claim 2, wherein said polymer gel is a water-soluble gel comprised of an acrylamide homopolymer or copolymer.

4. The process as defined by claim 2, wherein said polymer gel is a hydrophilic gel comprised of a reticulated acrylamide copolymer.

5. The process as defined by claim 2, wherein said polymer gel is a hydrophilic gel comprised of a copolymer of acrylamide, acrylic acid and a polyfunctional reticulating comonomer.

6. The process as defined by claim 1, wherein said polymer gel is produced by thin layer photopolymerization.

7. The process as defined by claim 1, said polymer gel comprising from 20 to 85% by weight of polymer.

8. The process as defined by claim 1 said processing aid powder comprising a silica, silicate, alumina, starch or fatty acid.

9. The process as defined by claim 8, said processing aid powder comprising a precipitated silica having a BET specific surface area ranging from 200 to 400 m²/g, particle diameter ranging from 200 to 800 Å, an average diameter of agglomerates of less than 100 microns and an apparent density of packed product of less than 0.25.

10. The process as defined by claim 8, said processing aid powder comprising a hydrated aluminosilicate.

11. The process as defined by claim 10, said hydrated aluminosilicate comprising attapulgite or sepiolite.

12. The process as defined by claim 1, wherein the amount of powder required for complete coating of the flakes plus the excess amount of the processing aid powder together comprise from 5 to 40% by weight of the weight of said polymer gel.

13. The process as defined by claim 12, said amount of powder required for complete coating of the flakes plus said excess amount together comprising from 15 to 35% by weight of the weight of said polymer gel.

14. The process as defined by claim 12, further comprising sifting excess powder from the product flakes and recycling same to said comminuting step.

15. The process as defined by claim 1, said comminuting comprising grinding.

16. The process as defined by claim 1, said comminuting comprising chopping.

17. The process as defined by claim 1, said comminuting comprising shredding.

18. The process as defined by claim 1, said comminuting comprising screw extrusion grinding.

19. A process for the production of a plurality of small, storage-stable, non-adhering and free-flowing flakes of a hydrophilic or water-soluble gel comprising an acrylic polymer, said flakes being coated with a thin adherent film of a processing aid powder which is a silica, a silicate, an alumina, a hydrated aluminosilicate, a starch or a fatty acid, said process comprising the step of comminuting a larger shaped article of said polymer gel in the presence of said processing aid powder, said powder being present in an amount in excess of an amount required for complete coating of the burst or fragmented polymer grains or flakes coated with said powder which are thus obtained, the average dimensions of said flakes being in the range of from approximately 0.3 to 8 mm.

20. A process as defined by claim 19, wherein said processing aid powder is present during the comminuting step in an amount sufficient to result in a substantially complete coating of said flakes of said gel.

21. A process for the production of a plurality of small, storage-stable, non-adhering and free-flowing flakes of a gel of a hydrophilic or water-soluble polymer coated with a thin adherent film of processing aid powder, consisting essentially of a step of comminuting a larger shaped article of the polymer gel in the presence of a processing aid powder, said powder being present in an amount in excess of an amount required for otherwise complete coating of the flakes which result, and said powder being inert with respect to the polymer and either water absorbent or adapted to prevent dehydration of the polymer gel.

* * * * *